May 24, 1955
H. J. AVERETT
2,708,950
PIPE END COVER AND PROTECTOR
Filed April 13, 1953
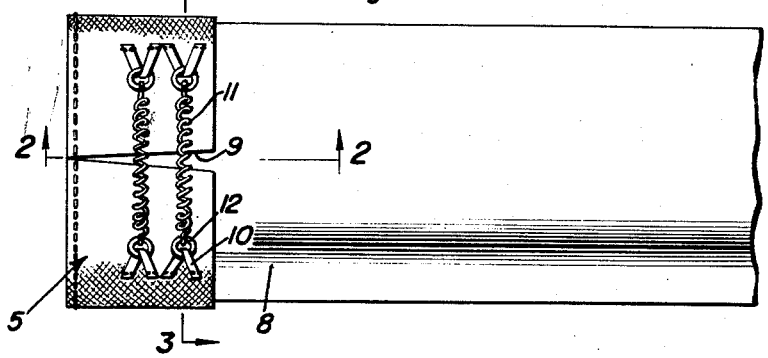
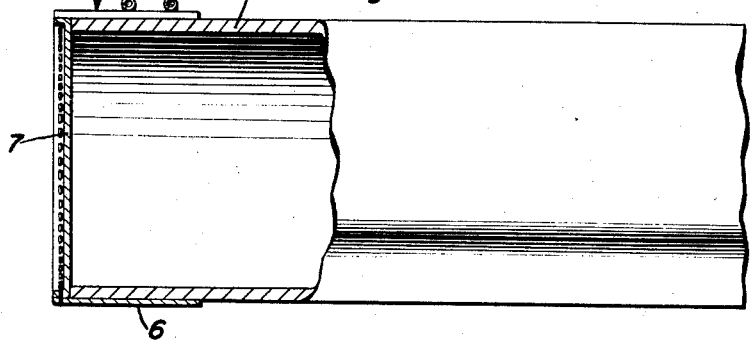
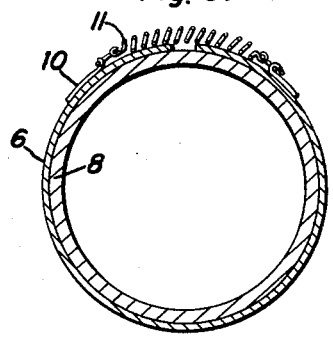
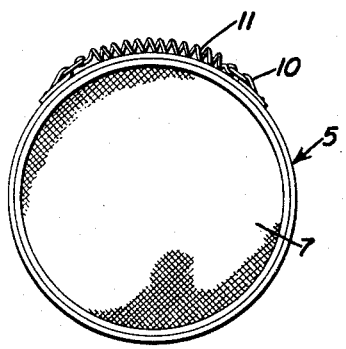
Harold J. Averett
INVENTOR.

United States Patent Office 2,708,950
Patented May 24, 1955

---

2,708,950

PIPE END COVER AND PROTECTOR

Harold J. Averett, Oakland, Iowa, assignor of fifty per cent to P. T. McDonough, Ogden, Iowa Application April 13, 1953, Serial No. 348,291

3 Claims. (Cl. 138—96)

The present invention relates to a cover for temporarily closing the open end of a pipe during construction of a pipe line and is a continuation-in-part of my co-pending application Serial No. 142,673, filed February 6, 1950, now abandoned.

In the past, during the construction of pipe lines such as gas lines, water lines and the like, wherein the pipe sections are welded together end to end, no convenient means has been found for temporarily covering the ends of the pipe sections prior to welding these ends to the ends of adjacent pipe sections which have been set in place in the pipe line trench. Thus, considerable additional time is wasted during the construction of the pipe line while the ends of the pipe sections are being cleaned in preparation for the welding operation.

In providing temporary pipe section end covers in the past, none have been developed which may be quickly and simply applied and removed and which will not be subject to being blown off the end of the pipe section as the opposite end of the section is welded to an adjacent end. Where such coverings have been easily removed and applied, the heat developed within the pipe section during the welding operation at the other end of the pipe section has caused the air within the pipe to expand and push the cover off the end of the pipe section thereby exposing the end to the mud and the silt within the trench and necessitating the repreparation of this end of the piping for the welding operation.

It is the primary object of the present invention to provide a temporary cover for the end of a pipe section which will be simply and easily applied and which is constructed in such a manner as to allow the air pressure which builds up within the pipe section during the welding operation at the other end to escape through the cover without blowing the covering off the end of the pipe.

Another object of the invention is to provide a temporary pipe end covering which is simple and practical in its construction, which may be expanded and contracted to fit a variety of pipe sizes and which is relatively inexpensive to manufacture.

These, together with ancillary objects and features which will become apparent as the following description proceeds, are attained by this invention, a preferred embodiment of which is shown by way of example only in the accompanying drawings, wherein:

Figure 1 is a side elevational view of the end portion of a pipe with the cover attached;

Figure 2 is a longitudinal sectional view taken substantially along the section line 2—2 of Figure 1;

Figure 3 is a transverse sectional view taken substantially along the section line 3—3 of Figure 1; and Figure 4 is an end elevational view of the inner end of the temporary cover.

Referring now to the accompanying drawings in detail, wherein like numerals designate like parts throughout the various views, the numeral 5 designates the temporary end cover in its entirety, this cover comprising a cap-like member of flexible or pliable material or fabric.

The cover 5 comprises a substantially disk-shaped face or end plate 7 adapted to overlie the end of the pipe section 8 and close the same. A marginal flange or ring 6 secured to the face 7 is adapted to frictionally embrace the wall of the pipe 8 adjacent the end thereof.

The marginal flange 6 is formed with a V-shaped split or notch 9, opening into the free edge of the marginal flange 6 and having its apex at the juncture of the flange to the end plate or face 7. The purpose of this notch 9 is to enable limited expanding action of the marginal flange to facilitate fitting the same around the pipe wall to frictionally clamp the end cover in place.

Secured to the outer surface of the marginal flange on opposite sides of the notch 9 are loops 10 which are connected to one another by means of coil springs 11 which extend transversely over the notch 9 to continually resiliently urge the edges of the V-shaped notch 9 toward one another to provide the clamping action of the flange on the wall of the pipe. Eye members 12 interengage the loops with the ends of the coil springs 11 and constitute the means for securing the ends of the coil springs to the loops.

Therefore, during the construction of the pipe line, the open end of the pipe 8 may be temporarily closed by slipping the cover 5 over the end of the pipe section 8 to protect the same from mud or silt and other debris as the pipe section is lowered into place in the trench. It might also be noted in this connection, that the cover will prevent the entrance of animals into the pipes in addition to maintaining the end of the pipe clean during handling preparatory to the welding of the end of the pipe to an adjacent pipe section.

When the pipe end cover 5 is in place on the pipe section 8, and the other end of the pipe section 8 is being welded to an adjacent pipe section, the expanding air within the pipe section 8 will force or press against the face 7 of the cover 5. When this occurs, the particular V-shaped construction of the notch 9 causes a temporary expansion of the notch or split adjacent the apex of this split and decreasing toward the free edge of the marginal flange. This expansion permits some of the heated air to escape through this end of the pipe section until the pressure within the pipe is again equalized with the atmosphere. Thus, the split portion 9 serves as a vent for permitting the escape of the air from the pipe in such a manner that the cover will not be pushed off the end of the pipe during the expansion of the air within the same since the frictional engagement of the marginal flange 6 upon the wall surface of the pipe section 8 is sufficient to prevent such inadvertent removal of the pipe end cover 6.

In view of the foregoing description it is believed that the construction and operation of the invention will be readily understood. However, since numerous modifications and changes will occur to those skilled in the art after a perusal of the foregoing description taken in conjunction with the accompanying drawings, it is not desired to limit the invention to the exact construction shown and described. But, all suitable modifications may be resorted to which fall within the scope of the appended claims.

What is claimed as new is as follows:

1. A pipe end cover comprising a cap-like member of pliable material, said member including a substantially disk-shaped face adapted to overlie the end of a pipe and a marginal flange adapted to frictionally embrace the wall of the pipe adjacent the end thereof, said flange having a notch therein extending from the free edge thereof to a point adjacent the juncture of the flange with the face of the member, the edges of said flange defining said notch converging from the free edge of said flange to an apex adjacent the juncture of the flange with the face, and resilient means overlying said notch and attached to said flange on opposite sides of said notch to draw the notch defining edges of said flange toward one another.

2. The combination of claim 1 wherein said resilient means include a pair of longitudinally spaced circumferentially extending coil springs.

3. For use in a pipe line construction wherein pipe sections are welded in end to end relation to one another, a temporary pipe end cover for protecting the end of a pipe section preparatory to welding the same comprising a cap-like member of pliable material, said member including a substantially disk-shaped face adapted to overlie and close the end of the pipe section, a marginal flange on said face adapted to frictionally embrace the wall of the pipe section adjacent the end thereof, said flange having a notch therein extending from the free edge thereof to a point adjacent the juncture of the flange with the face, the edges of said flange defining said notch converging from the free edge of said flange to an apex adjacent the juncture of the flange with the face whereby air can escape from the interior of the pipe section through a portion of the notch, and resilient means overlying said notch and attached to said flange on opposite sides of said notch to draw the notch defining edges of said flange toward one another.

References Cited in the file of this patent
UNITED STATES PATENTS

| | | |
|---|---|---|
| 1,028,057 | Naylor | May 28, 1912 |
| 1,266,423 | Denise et al. | May 14, 1918 |
| 2,406,745 | Curtze | Sept. 3, 1946 |